June 16, 1925.

F. E. HARTMAN ET AL

ELECTROLYTIC CELL

Original Filed March 21, 1922   2 Sheets-Sheet 1

1,541,947

WITNESSES:

Inventors
F. E. Hartman,
H. B. Hartman,
Attorney

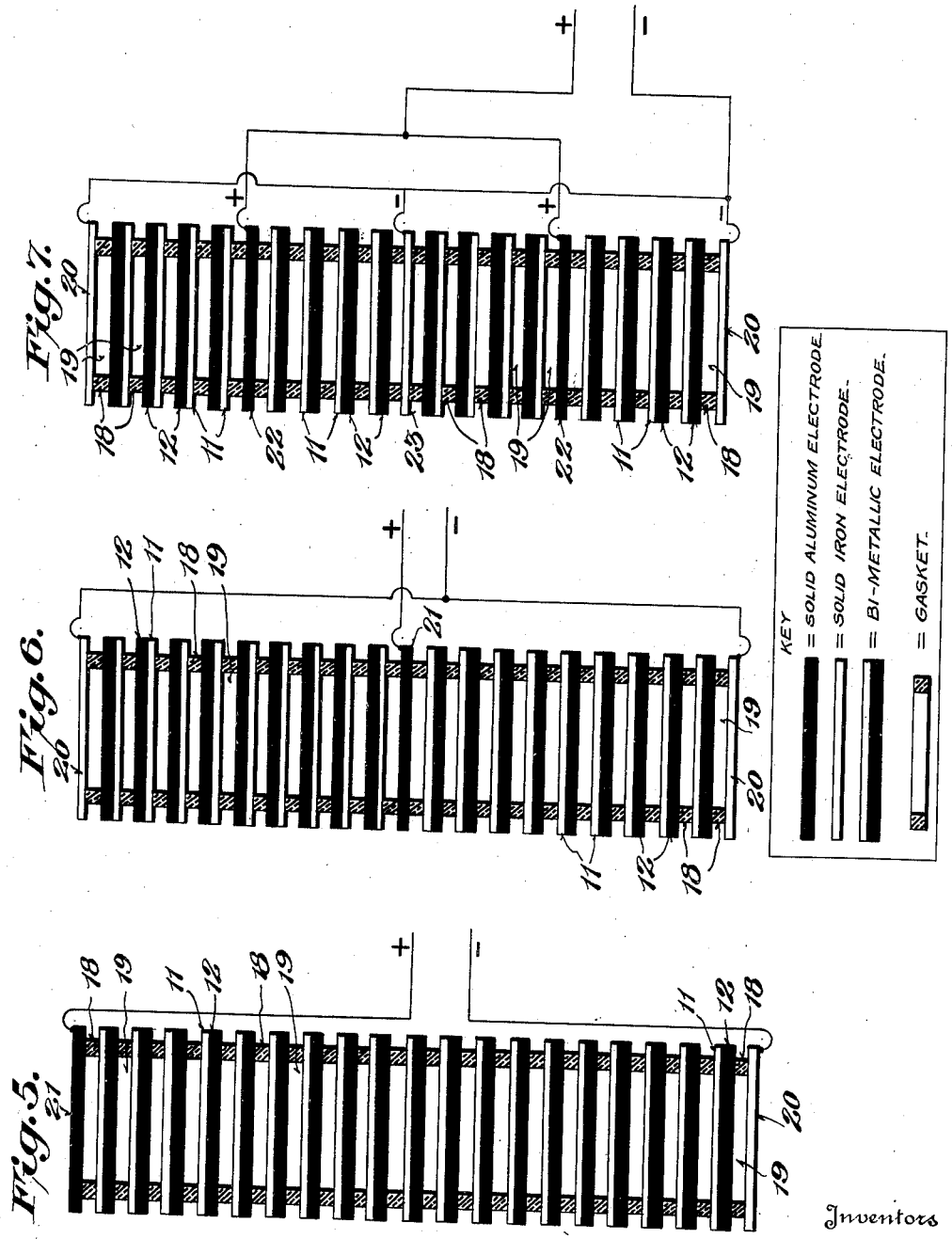

1,541,947

Patented June 16, 1925.

UNITED STATES PATENT OFFICE.

FRANK E. HARTMAN AND HARRY BUXTON HARTMAN, OF SCOTTDALE, PENNSYLVANIA, ASSIGNORS TO ELECTRIC WATER STERILIZER & OZONE COMPANY, OF SCOTTDALE, PENNSYLVANIA, A CORPORATION OF PENNSYLVANIA.

ELECTROLYTIC CELL.

Application filed March 21, 1922, Serial No. 545,509. Renewed April 3, 1925.

*To all whom it may concern:*

Be it known that we, FRANK E. HARTMAN and HARRY B. HARTMAN, citizens of the United States, residing at Scottdale, in the county of Westmoreland and State of Pennsylvania, have invented certain new and useful Improvements in Electrolytic Cells, of which the following is a specification.

This invention relates to a novel improvement in electrolytic cells of the type used in water purifying apparatus, and more particularly to a novel electrode unit for use in connection therewith.

In the purification of water by the electrolytic process, metallic hydroxides are produced for coagulating and precipitating the suspended particles. In other words, the electrolytic method of water purification is dependent upon electrolysis of the mineral matter held in solution and certain definite reactions between component parts of the mineral matter and the metals that serve as the electrodes. Ordinarily an electrolytic cell or so-called electrode box consists of a number of metallic plates or electrodes usually arranged in stacked relation and provided with suitable slots or openings for causing the water to traverse the entire area between the plates, a suitable gasket of course being provided to seal the water and form the desired passageway for it between the electrodes. Two or more of the electrode plates are connected to a source of electrical energy and the current density is then regulated to produce the required amount of hydroxide. A cell of the general type set forth is illustrated in Patent No. 1,101,278 granted to H. B. Hartman, June 23, 1914, and, as will be understood from that patent, suitable accessories, such as a coagulation or sedimentation chamber and filter, are used in connection with the cell to complete the purification of the water.

Primarily the present invention has in view the more effectual production of the metallic hydroxides which effect the purification of the water, and to that end it is proposed to provide a novel bi-polar and bi-metallic electrode unit which may be arranged in an electrode box assembly in substantially the same manner as the single plate electrode units in the patent referred to. That is to say, it is proposed to provide a bi-metallic electrode unit which may be arranged in stacked relation to form the cell in such a manner as to produce a more constant quantity of hydroxide that can be produced with ordinary electrode plates, thereby more effectually and expeditiously purifying the water.

With the above and other objects in view which will more readily appear as the nature of the invention is better understood, the same consists in the novel construction, combination and arrangement of parts, hereinafter more fully described, illustrated and claimed.

A preferred and practical embodiment of the invention is shown in the accompanying drawings in which Figure 1 is a diagrammatic vertical section showing an electrolytic water-purifying cell embodying the bi-metallic electrodes.

Figures 5, 6 and 7 show various ways of connecting our electrode elements for use with electric current in order to obtain various current strengths.

Similar reference characters designate corresponding parts throughout the several figures of the drawings.

Figure 1:
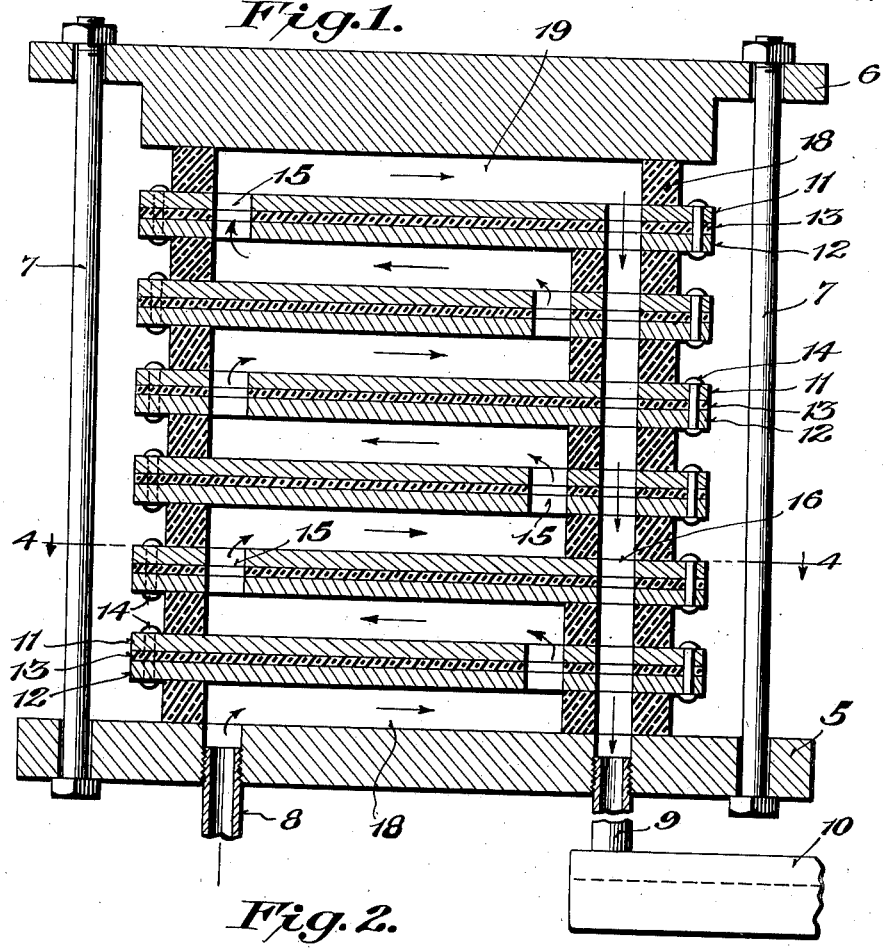
Figure 2:
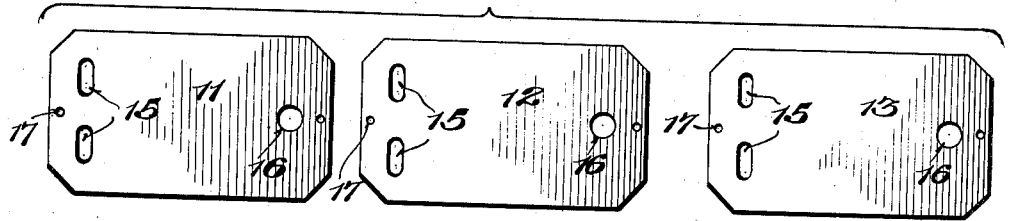
Figure 2 is a plan view showing the several individual elements forming a bi-metallic electrode unit.

As previously indicated it is the purpose of the present invention to provide a novel bi-metallic electrode unit designated generally as A, any desired number of said units being employed to complete the water purifying cell, which is designated generally as B.

As will be observed from the drawings the characters 5 and 6 respectively designate the top and bottom plates of the cell B, the said plates being clamped together by means of the bolt 7 or the like, which permit of facile assembly of the electrode units A and also permit of easy access to the individual units for purposes of inspection or repair. An influent pipe 8 receives raw water from the mains and this water is discharged through the effluent pipe 9 from the cell to a sedimentation tank 10.

The active portion of the cell consists of the electrode units or plates A, each of which include an iron cathode 11 and an aluminum anode 12, separated by a fiber gasket 13 which prevents seepage of water between them. Rivets 14 are used to assemble and electrically connect one iron cathode 11, one aluminum anode 12, and an intermediate gasket 13 as shown in Figure 1. This structure, it will be observed, is a unit and is therefore more easily inserted or removed than a similar number of electrodes if composed of separate plates.

The cathode and anode plates 11 and 12 and gaskets 13 are formed from sheets of their respective materials by simple operations. Apertures 15, 16 and 17 are formed in the plates, the apertures 15 constituting the upward passage for the water and the apertures 16 constituting the downward passage, while the apertures 17 receive the securing rivets. The gaskets 13 are designed to prevent water seepage between the plates, as such seepage might result in the formation of a local circuit which would injuriously affect the operation of the cell.

Figure 4:
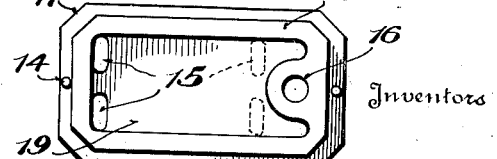
Figure 4 is a plan view of a gasket for separating the bi-metallic electrodes.

A plurality of the electrode units A are superposed between the plates 5 and 6, and are spaced apart by waterproof gaskets 18, which are shaped as shown in Figure 4. These gaskets form electrolytic chambers 19 within the separated electrode plates, through which the influent water passes tortuously, as indicated by the arrows, in its upward course, until it reaches the topmost chamber from which it descends through the aperture or channel 16, and passes to the sedimentation tank 10. The water during its upward movement is subjected to a continued electrolysis which decomposes salts contained therein, and causes the electrolytic products thus formed to oxidize matter in the raw water and purify the latter. Part of the products of electrolysis remain in the water, and later serve to precipitate or clarify it.

The chemical action of our improved electrode units is as follows:—

Water to be purified commonly contains sodium, calcium, and magnesium salts, notably chlorides, carbonates, and sulfates.

These salts are partially dissociated into their ions, while some of the products of dissociation are further subject to hydrolysis, producing in addition hydrogen and hydroxyl ions. During the electrolysis, the acid radicals are liberated at the anode, combining with the aluminum, of which the anode is formed, thus producing aluminum salts. The hydroxyl ions are also liberated at the anode and they unite to form water and free oxygen.

In the cathode section, the alkaline earths and metals are liberated, and since the iron cathode is passive toward alkalies, they form hydroxides by reacting with the water. When the electrolytes from the anode and cathode sections mingle, the hydroxides react with the aluminum salts from the aluminum hydroxide and reestablish the condition of the salts which existed previous to the electrolysis.

The reactions of the calcium salts may be expressed as follows:

Reaction #1—hydrolysis of the carbonate:

$$CaCO_3 + 2H_2O = Ca(OH)_2 + H_2CO_3$$

Reaction #2—hydrolysis of the carbonic acid:

$$H_2CO_3 + H_2O = 2H + 2OH + CO_2$$

Reaction #3—between aluminum anode and chlorine:

$$Al + 3Cl = AlCl_3$$

Reaction #4—between the hydroxyl ions:

$$4OH = 2H_2O + O_2$$

Reaction #5—metallic calcium with water:

$$Ca + 2H_2O = Ca(OH)_2 + H_2$$

Reaction #6—

$$2AlCl_3 + 3Ca(OH)_2 = 2Al(OH)_3 + 3CaCl_2$$

Of the above reactions, Numbers 3 and 4 show the reactions in the anode section of the cell, equation Number 5, showing the reaction in the cathode section of the cell, while Number 6 shows the reaction resulting when the electrolytes from the anode and cathode sections mingle.

It will therefore be seen that the reagents for purifying water are oxygen and aluminum hydroxide. These are produced within the water itself, thus having greater efficiency than could be obtained by their mechanical introduction. The oxygen of equation Number 4 is highly effective in destroying organic matter and deodorizing. The aluminum hydroxide of Number 6 is a coagulant or precipitant of well known virtue.

The hydrogen escapes as gas from the cathode plate. We find, therefore, that the net result is a reestablished balance between basic and acid ions in the water. The coagulant or metallic hydroxide is therefore obtained from the pure metal directly, in an insoluble form; and nothing is added to the water beyond the metallic hydroxides.

The calcium hydroxide in contact with aluminum would tend to form a calcium metaluminate, which is soluble, and passive towards the aluminum salts of the acids. This condition inhibits the formation of the hydroxides which are necessary to react with the aluminum salts of the acids. It will be seen from this that aluminum is not a good metal for use as a cathode in the electrolytic production of coagulants for water purification.

On the other hand an iron anode is not desirable, as the iron hydroxide is less flocculent and less gelatinous than the aluminum compound, and when comparatively clear water is to be purified, if it contains large quantities of bacteria, aluminum is much to be preferred.

For this reason we have been led to adopt the bi-metallic plate described in the series cells used. Naturally, the end electrodes are of the single metal.

In assembling our cells, we may connect them in any desired manner to utilize the prevailing voltage. We prefer, in preparing the electrolytic cells, to have a standard number of plates for use within certain ranges of amperage density and feeding potential. To vary the current density, therefore, we dispose our cells in several arrangements as may be necessary. Some of the arrangements are shown in Figures 5, 6 and 7. These views are diagrammatic, and do not indicate the exact number of elements used between each unipolar electrode.

In Figure 5, all of the units are shown in series, the voltage being greatest across all of the cells, and the current density least. One end iron cathode 20, and one end anode 21 of aluminum, are used.

Figure 3:
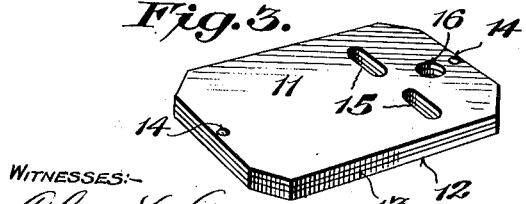
Figure 3 is a perspective view of said unit.

In Figure 6, the structure shows a similar number of electrolytic chambers 19, but for use on a different voltage, or to give a double current density with the same voltage. In this arrangement, the two end electrodes 20 are iron cathodes, while the aluminum anode 21 is inserted at the center point of the tier. The current flows in opposite directions from the center. The anode 21 may be one of the plates shown in Figure 3, which is similar to one of the bi-metallic electrode elements, but without the rivet holes.

The structure shown in Fig. 7 is for use where a quadruple current strength is required. It resembles the arrangement shown in Figure 6, but utilizes two intermediate anode plates 22 of aluminum, and one central iron cathode plate 23.

Without further description it is thought that the features and advantages of the invention will be readily apparent to those skilled in the art, and it will of course be understood that changes in the form, proportion and minor details of construction may be resorted to without departing from the spirit of the invention or scope of the appended claims.

We claim:

1. A composite bipolar electrode unit for electrolytic cells including an aluminum anode plate, and an iron cathode plate having an insulating sheet therebetween, means for uniting said plates, and both of said plates and sheet having openings.

2. A laminated electrode unit for electrolytic cells consisting of an insulation sheet, and iron and aluminum plates on opposite sides thereof, all of said plates having registering water-passage openings.

3. An electrolytic cell comprising unipolar electrode units and intermediate composite electrode units consisting of an insulation plate and iron and aluminum plates at each side thereof, and all of said plates having openings, a plurality of gaskets for spacing said units to provide chambers whose side walls are formed by the gaskets and whose top and bottom walls are formed respectively by the aluminum and iron plates of adjacent units.

4. An electrolytic cell comprising an aluminum terminal plate constituting the anode and an iron terminal plate constituting the cathode and a plurality of intermediate spaced apart composite electrode units adapted to be connected in series with said terminal plates and each including iron and aluminum plates insulated from each other, and said units having openings for permitting the passage of water.

5. A bipolar bimetallic electrode unit for electrolytic cells including an iron cathode plate and an aluminum anode plate, and an intermediate insulation plate.

In testimony whereof we hereunto affix our signatures in the presence of two witnesses.

FRANK E. HARTMAN.
HARRY BUXTON HARTMAN.

Witnesses:
E. L. KING,
MABEL FREEMAN.